United States Patent
Nyman et al.

(10) Patent No.: US 7,247,282 B2
(45) Date of Patent: Jul. 24, 2007

(54) METHOD FOR THE REMOVAL OF METALS FROM AN AQUEOUS SOLUTION USING LIME PRECIPITATION

(75) Inventors: Bror Nyman, Vanha-Ulvila (FI); Stig-Erik Hultholm, Pori (FI); Juhani Salmi, Kemi (FI); Jarmo Sivonen, Kiviranta (FI)

(73) Assignee: Outotec OYJ, Espoo (FI)

( * ) Notice: Subject to any disclaimer, the term of this patent is extended or adjusted under 35 U.S.C. 154(b) by 426 days.

(21) Appl. No.: 10/481,844

(22) PCT Filed: Jun. 14, 2002

(86) PCT No.: PCT/FI02/00523

§ 371 (c)(1),
(2), (4) Date: Dec. 23, 2003

(87) PCT Pub. No.: WO03/002774

PCT Pub. Date: Jan. 9, 2003

(65) Prior Publication Data

US 2004/0195183 A1    Oct. 7, 2004

(30) Foreign Application Priority Data

Jun. 29, 2001    (FI) .................................. 20011413

(51) Int. Cl.
*C01G 37/02*    (2006.01)
*C01G 49/02*    (2006.01)
*C01G 53/04*    (2006.01)
(52) U.S. Cl. .......................... 423/55; 210/724; 423/140

(58) Field of Classification Search ................. 423/55, 423/140, 150.3; 210/722, 724, 683, 688
See application file for complete search history.

(56) References Cited

U.S. PATENT DOCUMENTS

| | | | |
|---|---|---|---|
| 3,375,066 A | | 3/1968 | Murakami et al. |
| 3,800,024 A | | 3/1974 | Forsell et al. |
| 4,606,829 A | * | 8/1986 | Rice et al. ................. 210/713 |
| 5,120,447 A | * | 6/1992 | Christian .................. 210/714 |
| 5,266,210 A | * | 11/1993 | McLaughlin ............. 210/710 |
| 5,403,495 A | * | 4/1995 | Kust et al. ................ 210/710 |
| 5,618,439 A | * | 4/1997 | Allgulin ..................... 210/713 |
| 6,419,834 B1 | * | 7/2002 | Maree ........................ 210/722 |
| 6,547,874 B2 | * | 4/2003 | Eck et al. .................. 106/772 |

FOREIGN PATENT DOCUMENTS

| | | | |
|---|---|---|---|
| CA | 1040868 | | 10/1978 |
| DE | 3822953 | | 1/1990 |
| EP | 0622338 | | 11/1994 |
| EP | 1061141 | | 12/2000 |
| WO | WO 99/01383 | * | 1/1999 |

* cited by examiner

*Primary Examiner*—Wayne A. Langel
*Assistant Examiner*—James Fiorito
(74) *Attorney, Agent, or Firm*—Morgan & Finnegan, LLP

(57) ABSTRACT

The invention relates to a method for the removal of metals from their aqueous solution with lime precipitation, in conditions where a precipitate of metal hydroxide and gypsum is formed, which settles well and is easy to filter. The metals are precipitated from their aqueous solutions at a high pH value and the slurry is recirculated several times in the precipitation space, whereby the gypsum is precipitated as separate crystals instead of a solid layer. The method is particularly suitable for neutralization of the aqueous solution from the pickling of refined steel. Using this method enables the removal of metals and fluoride from the water in question.

18 Claims, 1 Drawing Sheet

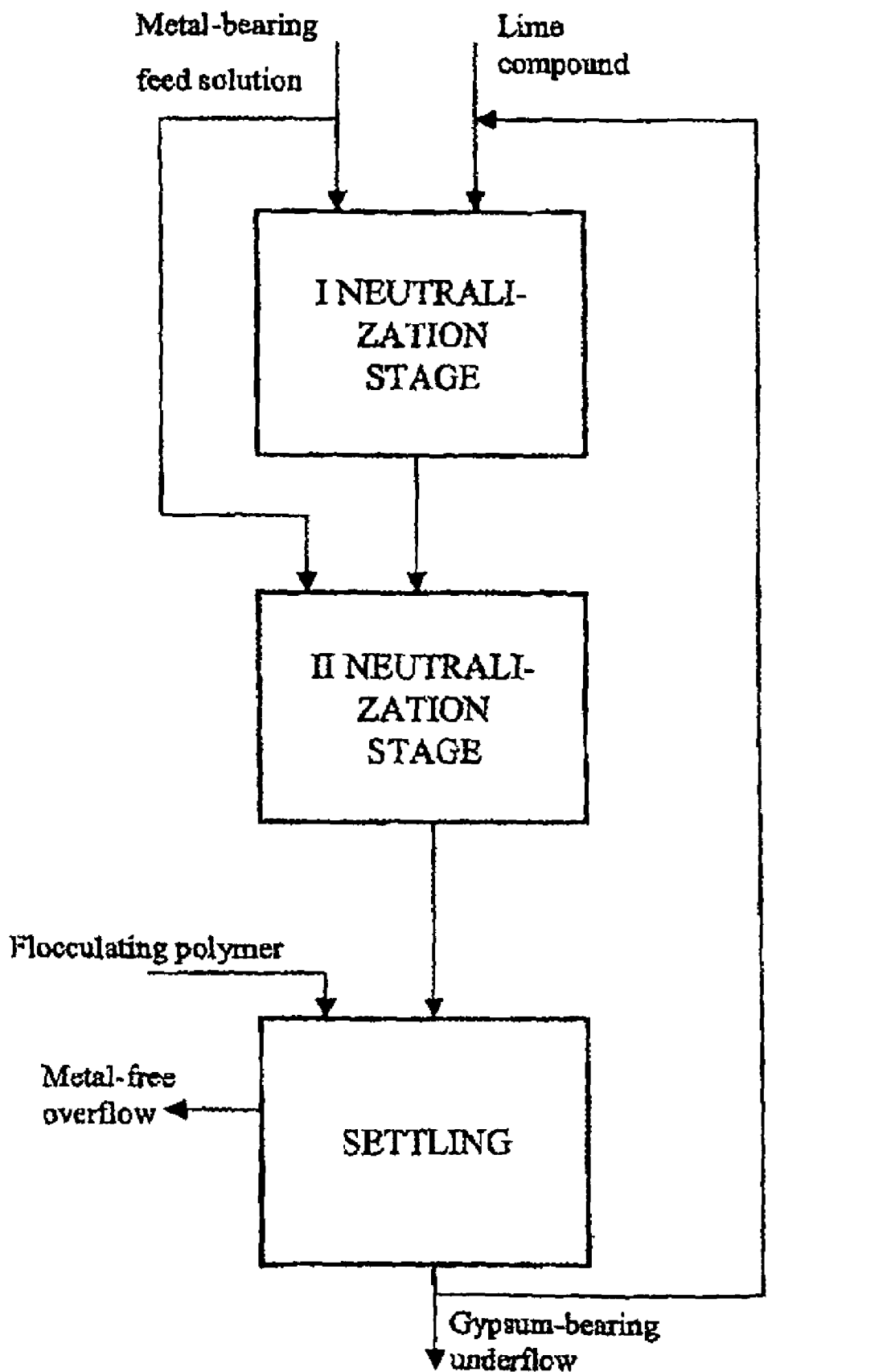

METHOD FOR THE REMOVAL OF METALS FROM AN AQUEOUS SOLUTION USING LIME PRECIPITATION

This invention relates to a method for the removal of metals from their aqueous solution with lime precipitation, in conditions where a precipitate of metal hydroxide and gypsum is formed, which settles well and is easy to filter. The metals are precipitated from their aqueous solutions at a high pH and the slurry is recirculated several times in the precipitation space, whereby the gypsum is precipitated as separate crystals instead of as a solid layer. The method is particularly suitable for neutralization of the aqueous solution from the pickling of refined steel. Using this method enables the removal of metals and fluoride from the water in question.

The layer of oxides generated on the surface of steel strip during annealing is removed by pickling. Often electrolytic pickling is performed first, where the oxide layer is removed from the strip using an electric current. Sodium sulphate solution is used as the electrolyte. The strip is fed through the solution and the anode reaction generates sulphuric acid, which acts as the pickling agent. The sulphuric acid is highly active when generated and is able to dissolve the oxides formed on the surface of the strip during annealing into sulphates. The rest of the oxides and the chrome-poor area of the steel strip are removed by mixed acid pickling, where nitric acid and hydrofluoric acid are in an aqueous solution. Often nowadays there is also some sulphuric acid in the solution, either directly as an addition or as a result of regeneration treatment.

In electrolytic pickling an aqueous solution is formed containing the metals dissolved from the surface of the steel strip. These metals are mainly iron, nickel and chrome. In order to prevent precipitation of the electrolyte bath a certain amount of the solution is removed and replaced. The removed solution and likewise the post-electric pickling steel strip flush water are combined for chrome(IV) reduction treatment. After reduction treatment the solution is more acidic. The solution obtained is combined again with the flush water used for washing the steel strip after mixed aid pickling. The combined solution is routed to neutralization in order to remove the metals.

In DE publication 3822953 a method is described, whereby a hydrochloric acid solution of a hot-galvanizing bath is routed first to ion exchange and from there the solution containing acid and metals is taken on to neutralization. In the first neutralization step the pH is raised to 8.5 and the precipitate generated is taken to filtration, from where a filter cake is recovered containing iron and zinc. The overflow solution from precipitation is taken to a second neutralization step, where neutralization is performed with sulphuric acid to a pH of 7. Gypsum is precipitated at this stage, and the overflow is routed as circulating water back to the galvanizing bath via ion exchange.

When lime compounds are used in the neutralization of sulphate solutions there is a danger that the gypsum formed will precipitate as a solid layer on the precipitation reactor and piping and that this will increase the maintenance requirements for the equipment and pipes. This danger is particularly likely when the pH value of the solution to be neutralized is raised gradually using a lime compound to the value where the actual neutralization takes place, and if the mixing in the reactor is non-uniform (a blade mixer).

A method has now been developed whereby an aqueous solution containing in particular iron and nickel can be neutralized using a lime compound in order to remove the metals from the solution as metal hydroxides and the lime as crystalline gypsum. Fluorides are also removed from the aqueous solution. The method is particularly suitable for treatment of an electrolytic solution and pickling flush water from steel pickling. According to this method, neutralization takes place in at least two stages, where the first stage is performed at a pH value of minimum 10.5, and the second and subsequent stages at considerably lower values. The final stage is the settling of the precipitate, from whence the gypsum- and metallic hydroxide-bearing precipitate is circulated back to the first neutralization stage, which promotes the formation of loose gypsum crystals. The essential features of the invention will be made apparent in the attached claims.

The invention is illustrated in the FIGURE, which presents the method as a flow sheet.

The explanation of the invention mainly describes the neutralization of an aqueous solution from the pickling of refined steel, but the invention is not limited only to this purpose, but can be used for other neutralization applications also. According to the method now developed, the majority of a metal-containing feed solution is routed to the first neutralization stage, into which a lime compound is also fed as a neutralizing agent, for example in the form of lime milk ($Ca(OH)_2$). It has proved expedient to feed both the feed solution and the lime compound to the surface of the neutralization reactor solution. The feed solution and lime compound are fed from opposite sides of the reactor. The gypsum- and metallic hydroxide-containing underflow from settling is also fed with the lime compound into this stage, and it is beneficial to premix this into the lime compound just prior to feeding it into the neutralization reactor. A surplus of lime compound is added in relation to the metals to be precipitated and any possible free acid. The feed of the lime compound precipitate is specified so that in this neutralization stage the pH is raised to a value of at least 10.5, even up to 11.5, in other words far higher than ordinary neutralization levels. Most metals precipitate at a pH of 10 as for instance nickel, which precipitates as nickel hydroxide. It has been proven that the purification of the feed solution is intensified when the neutralization stage is held at a pH value of 0.5-1.5 units higher than in ordinary methods. The higher pH values used also accomplish the co-precipitation of impurities.

The slurry from the first neutralization stage is led in its entirety to the second stage, where a portion of the metal-containing feed solution is also taken, for instance 5-30%. It is again advantageous to feed the feed solution and the first stage slurry to the surface of the neutralization reactor solution and to direct the said feeds from either side of the reactor centre as in the first stage. The feed solution regulates the pH value of the second neutralization stage, which is specified as somewhat lower than the pH of the first neutralization stage, e.g. 9.5-10.5. The neutralization stages are equipped with pH sensors to ease regulation. The neutralization stages are in series in relation to the gypsum-containing underflow and the lime compound, i.e. they flow through both or all the neutralization stages. The stages are mainly in series also in relation to the feed solution, since only 5-30% is fed directly into the second neutralization stage. The gypsum content of the neutralization stages is adjusted between 10-50 g/l, and this amount is advantageous for the formation of loose gypsum crystals. Gypsum crystals are precipitated and grow on top of one another and thus gypsum deposits in the immediate environment are avoided. It is beneficial for the formation of loose gypsum crystals that the pH is higher in the first neutralization stage than in subsequent stages, and that the pH is maintained at rather high levels, as presented above.

Each neutralization stage takes place in a separate reactor, equipped with baffles and a suitable mixing element for the purpose. Such is for instance a helix-type mixer as described in U.S. Pat. No. 5,182,087, which has a structure with two tubes circling around a shaft, making ⅓-2 revolutions around the shaft. A mixing element can achieve a powerful vertical circulation in neutralization reactors, upward from the sides of the reactor and downward at the centre of the reactor and from there again to the sides of the reactor. A powerful circulation in itself is enough to reduce the adhesion of particles to the structure of the neutralization reactor. The diameter of the mixing element is 50-80% of that of the neutralization reactor. This kind of mixer cannot leave to rotate in a small cavity of gypsum, as can happen with a blade mixer in a gypsum-forming environment. Thanks to the strong vertical circulation, the mixing of the feed solution and the lime compound and the increase in the pH of the solution are swift, and occur within 1-15 seconds. In conventional neutralization, mixing and pH increase require several minutes.

The large size of the mixer in relation to the diameter of the reactor enables the whole of the reactor volume to be kept well mixed even at low rotation speeds, such as for instance 30 rpm. Thus the shear forces caused by the mixing element also remain small. When the materials to be fed into the reactors are routed to the surface of the reactor solution, the flow obtained with the mixing element downward from the centre mixes the materials together well and circulates them within the reactor.

From the final neutralization stage the precipitate is taken to settling, and a flocculant, a polymer that flocculates solids is also conducted there. Most of the gypsum-containing underflow is circulated back to the first neutralization stage and only a portion is removed totally from the neutralizing circuit. It is advantageous that the underflow is recirculated between 5-15 times on average, before being removed from the circuit. Flocculant consumption is low, only 50-150 g per tonne of solids fed to the settling stage. Underflow circulation promotes the formation of gypsum as crystals and also improves the quality of the metallic hydroxide precipitate as well as its settling and filtering properties. The intensity of mixing in the neutralization reactors is adjusted so that the flocs generated are not broken up by the effect of the mixing.

When the underflow is recirculated, the flocculant is also recirculated in the neutralization stages, and this means that the amount of flocculant to be added can be kept small. Since the mixing intensity of the reactors is altogether low, the underflow flocs are not broken to any great extent, which also keeps the flocculant consumption low. The underflow to be removed from the settling stage contains gypsum precipitate and metallic hydroxides, and this is taken further to filtration. The metal-free overflow is so pure, that it can be routed back to several different points where water is used. The process is not temperature-sensitive, and can operate within a wide range of temperatures, between 5-95° C.

The invention is described further using the following examples:

EXAMPLE 1

A metal-containing solution was treated in two neutralization reactors, connected in series. The volume of each reactor was 5 l. The mixer used in each was a helix mixer, with a rate of 0.9 W/l. The temperature of the reactors was 50° C.

The content of the feed solution is shown in Table 1 below. The metals were in nitrate and fluoride form. In addition, there was 17 g/l of sodium sulphate, and the pH of the solution was 1.7. The solution to be treated was fed to the solution surface of the first reactor at 4.1 l/h. A surplus of lime was fed into the reactor for neutralization as lime milk slurry, so that the lime milk content was 40 g/l and the flow rate 0.52 l/h.

In the first neutralization stage the pH of the slurry rose to 10.9. In the second neutralization stage the pH was adjusted to a value of 10.0 by feeding 0.95 l/h of feed solution to the surface of the solution. The attached table shows that it was possible to remove the metals and fluorides almost completely using the method and that the solution is suitable for circulation to various points of use.

TABLE 1

| | Feed solution | | | | I neutralization stage | | | | II neutralization stage | | | |
|---|---|---|---|---|---|---|---|---|---|---|---|---|
| Time | Fe mg/l | Cr mg/l | Ni mg/l | F mg/l | Fe mg/l | Cr mg/l | Ni mg/l | F mg/l | Fe mg/l | Cr mg/l | Ni mg/l | F mg/l |
| 8 h | 1000 | 230 | 220 | 890 | <0.01 | <0.1 | 0.03 | 8.8 | <0.01 | <0.1 | 0.03 | 8.9 |
| 16 h | 1000 | 230 | 220 | 890 | <0.01 | <0.1 | <0.02 | 9.2 | <0.01 | <0.1 | <0.02 | 9.0 |
| 24 h | 1000 | 230 | 220 | 890 | <0.01 | <0.1 | <0.02 | 8.9 | <0.01 | <0.1 | <0.02 | 9.0 |
| 32 h | 1000 | 230 | 220 | 890 | <0.01 | <0.1 | 0.03 | 9.6 | <0.01 | <0.1 | 0.03 | 9.2 |
| 40 h | 1000 | 230 | 220 | 890 | <0.01 | <0.1 | 0.02 | 9.1 | <0.01 | <0.1 | 0.04 | 8.9 |

EXAMPLE 2

As in the previous example, a metal-containing solution was treated in a neutralization line, comprising two neutralization reactors. The volume of each reactor was 62 $m^3$ and the diameter of the settling reactor 27 m. Helix mixers were used as the mixing element in both reactors, where the helix tubes rotated around the mixing shaft for ½ cycle. The diameter of the mixer was 2.8 m and the rotation speed 30 rpm.

In a certain run 72 $m^3$/h of feed solution was processed, of which 55 $m^3$/h was fed into the first reactor and 17 $m^3$/h into the second. 24 $m^3$/h of the underflow from the settling reactor (thickener) was circulated back to the first reactor, and 0.8 $m^3$/h of lime milk with a $Ca(OH)_2$ content of 230 kg/$m^3$ was mixed with it. The solution routed to the reactor was directed to the surface of the reactor near the inner edge of the baffle, however clearly to the front side of the baffle. The lime/underflow precipitate on the other hand was routed to the surface in a corresponding manner in the vicinity of the baffle located on the other side of the centre.

The flocculating polymer used was Fennopol A305, at a content of 0.5 g/l. About 1 m$^3$/h of the solution in question was added, in other words about 70 g per tonne of solids fed into the thickener. The amount of flocculant is about ⅓ of that normally used. Nevertheless the above amount was sufficient to keep the thickener feed in a flocculated state and to keep the overflow clear. Thus another benefit of our method is the reduction of flocculant consumption.

The invention claimed is:

1. A method for the removal of metals from their aqueous solution as metallic hydroxides and gypsum using lime precipitation, comprising introducing a lime compound and a majority of a feed solution containing nickel, iron and chrome into a first neutralization stage to form a metallic hydroxide-gypsum slurry having a pH at least 10.5, feeding the balance of the feed solution and the slurry from the first neutralization stage in its entirety to a second neutralization stage where the pH of the slurry is adjusted to at least 9.5 and a precipitate forms; after the final neutralization stage setting the precipitate in a settling stage, and recirculating the metallic hydroxide-gypsum slurry to the first neutralization stage, wherein the pH of the second neutralization stage is less than the pH of the first neutralization stage, and wherein all of the lime compound or neutralizing agent is fed to the first neutralization stage.

2. A method according to claim 1, wherein the pH value of the first neutralization stage is 10.5-11.5.

3. A method according to claim 1, wherein the pH value of the second neutralization stage is 9.5-10.5.

4. A method according to claim 1, wherein the aqueous feed solution contains fluorides, which are removed during neutralization.

5. A method according to claim 1, wherein 5-30% of the metal-containing feed solution is routed to the second neutralization stage.

6. A method according to claim 1, wherein neutralization is performed with lime milk Ca(OH)$_2$.

7. A method according to claim 1, wherein the amount of gypsum is adjusted to be 10-50 g/l in the neutralization stages.

8. A method according to claim 1, wherein neutralization takes place at a temperature between 5-95° C.

9. A method according to claim 1, wherein the neutralization stages are equipped with pH sensors.

10. A method according to claim 1, wherein the neutralization stages are located in series in relation to the gypsum-containing underflow and lime compound.

11. A method according to claim 1, wherein both the feed solution and the lime compound are fed to the surface of the solution in the reactor in the neutralization stages.

12. A method according to claim 1, wherein the feed solution and the lime compound are fed to opposite sides of the reactor.

13. A method according to claim 1, wherein the metallic hydroxide-gypsum slurry is premixed into the lime compound before being fed into the neutralization reactors.

14. A method according to claim 1, wherein each neutralization stage takes place in a reactor that is equipped with a helix-type mixing element.

15. A method according to claim 14, wherein the diameter of the mixing element is 50-80% that of the neutralization reactor.

16. A method according to claim 1, wherein a preselected ratio of polymer to flocculate solids is fed into the settling stage.

17. A method according to claim 16, wherein the amount of the flocculating polymer is 50-150 g per tonne of solids fed into the settling stage.

18. A method according to claim 1, wherein the metal-containing aqueous solution is obtained from a electrolyte solution used in pickling steel and the pickling flush water.

* * * * *